Patented Jan. 16, 1951

2,538,050

UNITED STATES PATENT OFFICE 2,538,050

METHOD OF POLYMERIZING HIGH VINYL CHLORIDE-LOW VINYLIDENE CHLORIDE COPOLYMERS

John Leo Schick, Midland, Mich., assignor to The Dow Chemical Company, Midland, Mich., a corporation of Delaware No Drawing. Application May 21, 1949,
Serial No. 94,732

2 Claims. (Cl. 260—88.7)

This invention relates to a method for polymerizing mixtures of from 50 to 95 per cent monomeric vinyl chloride and correspondingly from 50 to 5 per cent monomeric vinylidene chloride in non-emulsified aqueous suspension under such conditions as to avoid agglomeration of the polymerizing particles and to produce reasonably uniform particles of a stable copolymer at a practical rate.

There are three common general methods of polymerizing vinyl chloride and vinylidene chloride monomers. When a homogeneous mixture of the two monomers and catalyst is polymerized without a solvent or diluent, and as a single liquid phase, to form a solid polymeric block, the process is variously called "mass" or "homogeneous" polymerization. This is to contrast it with the emulsion process in which the water-immiscible monomers and catalyst are dispersed in water by means of a "surface active" or emulsifying agent, to form a latex-like dispersion of fine particles of the polymeric body. Another process consists in mixing the monomers and catalyst with water, without using an emulsifying agent, and maintaining the dispersion by continued agitation at a temperature known to induce polymerization. The last-outlined process is sometimes referred to as "granular" or "pearl" polymerization, but is also commonly called "suspension" polymerization. It is to this method of polymerization that the present invention relates.

Experience has shown that mixtures of monomeric vinylidene chloride and vinyl chloride of any relative proportions can be polymerized in aqueous suspension, using a per-oxygen compound as a catalyst. It is found, however, that the product is often unsatisfactory for any of several reasons. The principal problem has arisen through the strong tendency of these materials, when polymerizing, to pass through a sticky and agglomerative condition in which the particles tend to merge with one another and to form large polymeric aggregates. Thus it happens that polymer particles are formed which vary widely in size and, because of the exothermic nature of the polymerization reaction and the low rate of heat transfer through the polymer, the product varies from very low molecular weight material at the core of the large lumps to very high molecular weight material in the water-cooled layers. The products are heterogeneous, both in size and quality. The problem is not solved by increasing the rate of agitation, since this serves to increase the opportunity for the sticky particles to agglomerate and later, when polymerization is nearly complete, results in grinding the polymer to a fine powder. Attempts have been made to keep the polymerizing particles isolated from one another by thickening the aqueous phase, using water-soluble gums or other protective colloids. These expedients are partially successful with those copolymers containing a preponderance of vinylidene chloridene, but are relatively unsuccessful when applied to the copolymers rich in vinyl chloride. The tendency to agglomeration can be modified, in the case of high vinylidene chloride copolymers, by introducing particles of finished copolymer into the suspension, where they serve possibly as uniform nuclei for the freshly forming polymer, but this procedure, also, is ineffective with the high vinyl chloride copolymers.

The principal object of this invention is to provide a method for the copolymerization of a mixture of vinyl and vinylidene chloride wherein vinyl chloride predominates, in non-emulsified aqueous suspension, to produce reasonably uniform fine polymeric particles of a stable copolymer at a practical rate.

In considering the problem, it appeared possible that the difficulties arising from agglomeration might be minimized or eliminated if the rate of polymerization could be increased and the duration of the sticky state be shortened. Any such increase in polymerization rate should be accomplished, if possible, without any great increase in temperature of the reaction, since it is known that molecular weight of polymers varies increasingly with the polymerization temperature, other conditions being constant. Hence, consideration was given to the relative rates of polymerization obtained when using each of several polymerization catalysts. The systems subjected to test consisted of 3 parts by weight of water and 1 part by weight of a mixture of 75 per cent of vinyl chloride and 25 per cent of vinylidene chloride, by weight, together with 1 per cent of the catalyst under test. The monomers and catalyst were dispersed at a constant rate of agitation, in a closed system, to prevent loss of monomers, and the agitated suspension was kept at 50° C. for periods up to 120 hours. The extent of polymerization and the condition of the polymer product were noted. Typical results appear in Table I.

Table I

| Catalyst | Time, Hours | Per Cent Polymerization | Description of Polymer |
|---|---|---|---|
| Benzoyl peroxide | 48 | 13.2 | sticky mass. |
| Lauroyl peroxide | 48 | 15.8 | Do. |
| Hydrogen peroxide+Fe [1] | 120 | 35.1 | sticky mass on walls of vessel. |
| Sodium perborate | | Exploded | |
| Potassium persulfate | 48 | 27.0 | sticky mass. |
| 2,4-dichlorobenzoyl peroxide. | 24 | 99.0 | hard white copolymer. |

[1] Note: 20 parts per million of iron, as ferric nitrate, in the aqueous phase.

None of the catalysts, except 2,4-dichlorobenzoyl peroxide, carried the reaction to a high enough conversion to polymer to pass beyond the objectionable sticky state, even though the reaction was continued in some cases as long as 120 hours. Even the rapid rate of polymerization obtained when using 2,4-dichlorobenzoyl peroxide failed to solve the problem, since the product was obtained only in the form of large hard lumps.

The tests were repeated, each mixture being modified by the addition of 2 per cent of a granulating agent, based on the weight of water, dissolved or suspended in the water phase. None of the tested granulating agents was effective when lauroyl peroxide, benzoyl peroxide, or potassium persulfate was used as catalyst in the system. A few of them exhibited a slight granulating action, but not enough to avoid the difficulties described above. When 2,4-dichlorobenzoyl peroxide was used as the catalyst, coarse granules were obtained with agar agar as the granulating agent and the present problem appeared to be solved when using either powdered hydrated aluminum oxide or the sodium salt of sulfonated polystyrene containing from 0.15 to 0.5 sulfonate radical per aromatic nucleus and having a particle size to pass a 100 mesh screen (U. S. sieve series). The use of powdered hydrated aluminum oxide for the present purpose is the subject of a concurrently filed application, Serial No. 94,731, while the present application is concerned with the use of the said sulfonated polystyrene.

Among the materials which failed to effect satisfactory granulation of a copolymer of 75 per cent vinyl chloride and 25 per cent vinylidene chloride, in the presence of 2,4-dichlorobenzoyl peroxide, are: fully polymerized powder of the same copolymer, bentonite clay, calcium silicate, lead silicate, magnesium hydroxide, magnesium pyrophosphate, methyl cellulose, polyvinylidene chloride, polyvinyl chloride, the water-soluble sodium salt of polyacrylic acid, and silicic acid. When lauroyl peroxide, benzoyl peroxide or potassium persulfate were substituted for 2,4-dichlorobenzoyl peroxide and similar tests were conducted, none of the following additional agents produced satisfactory granulation of the same copolymer: calcium carbonate, carboxymethyl cellulose and its sodium salt, casein, water-soluble hydroxyethyl cellulose, gelatin, triethylene glycol, higher polyethylene glycols, gum arabic, gum tragacanth, pectin, polyvinyl alcohol, sodium alginate, starch and talc.

Not only is the troublesome and objectionable sticky stage avoided in the suspension copolymerization of 50 to 95 per cent vinyl chloride and 50 to 5 per cent vinylidene chloride using 2,4-dichlorobenzoyl peroxide and the defined type of sulfonated polystyrene, but also the particle size of the copolymer is controllable by variation of the amount of sulfonated polystyrene employed. Thus, when 1 per cent of this granulating agent is used, based on the weight of monomers originally present, the average particle size may be from 50 to 100 mesh (U. S. sieve series), while the use of larger amounts up to 5 per cent of the same agent under otherwise identical conditions gives a product most of which passes a 100 mesh screen.

A typical result is illustrated in the following Table II, in which the original monomer mixture was 75–25 vinyl chloride-vinylidene chloride, the phase ratio was 2 parts by weight of water per part by weight of monomer mixture, the catalyst was 0.2 per cent of 2,4-dichlorobenzoyl peroxide, based on the weight of monomers, the temperature of polymerization was 50° C., and the reaction was carried out in a closed 200 gallon batch in a 200 gallon kettle having an anchor type of agitation turning at 88 revolutions per minute. One per cent of the sulfonated polystyrene was used.

Table II

| Size of Screen | Per Cent of Copolymer Retained |
|---|---|
| 20 | 0 |
| 30 | 3.0 |
| 50 | 16.0 |
| 70 | 27.0 |
| 100 | 24.0 |
| 200 | 20.0 |
| Pan | 10.0 |

It has been found, contrary to expectations, that, in the system just described, the particle size of the copolymer varies directly with the rate of agitation. That is, coarser particles are produced when the stirrer speed is increased, and finer particles are formed at low stirrer speeds, other factors being constant, so long as there is sufficient agitation to maintain dispersion of the polymerizing particles.

The various copolymerizations reported herein have illustrated the use of as little as 0.2 per cent and as much as 1 per cent of 2,4-dichlorobenzoyl peroxide, based on the weights of monomers. To illustrate the effects of various amounts of this catalyst in the described system, a series of runs is reported in Table III, all carried out using a temperature of 50° C., a ratio of 3 parts of water to 1 part of monomer, by weight, 0.15 per cent of agar agar based on the weight of monomers and 1 per cent of sulfonated polystyrene dust. The variables appear in the table. The runs were stopped after the indicated periods of time and the yield of polymer was determined.

Table III

| Per Cent Catalyst | Duration of Reaction, Hours | Approximate Per Cent Conversion of Monomers to Copolymer |
|---|---|---|
| 1.0 | 8 | 18 |
| 1.0 | 16 | 60 |
| 1.0 | 24 | 90 |
| 0.5 | 8 | 12 |
| 0.5 | 24 | 70 |
| 0.5 | 40 | 95 |
| 0.2 | 8 | 8 |
| 0.2 | 32 | 45 |
| 0.2 | 56 | 85 |

The results desired in the form and quality of the copolymer product are not obtained ordinarily until at least 70 per cent conversion of monomers to copolymer has been attained. The foregoing table gives an indication of time needed to reach this level under different conditions.

The product, as obtained directly from the present process, has a significantly lower content of residual volatile monomer than that usually encountered, and the volatile content of the copolymer particles is found here to be directly proportional to the average size of the particles. Thus, when the particle size is decreased, as described above, either by reducing the rate of agitation or by increasing the amount of sulfonated polystyrene used, the volatile content of the product is reduced.

The invention has been illustrated with respect to the copolymerization of mixtures of about 75 per cent vinyl chloride and 25 per cent vinylidene chloride, by weight. The same problem exists and the same procedure has been found to apply with like advantage in the copolymerization of mixtures of from 50 to 95 per cent vinyl chloride and correspondingly from 50 to 5 per cent of vinylidene chloride. In each case, the suspension polymerization of such a mixture in the presence of 2,4-dichlorobenzoyl peroxide and sulfonated polystyrene produces a copolymer at a practical rate and without any of the disadvantages arising from agglomeration of sticky particles. It is not generally economical to carry out the process in the presence of more than 4 or less than 1 part by weight of water per part of the monomer mixture.

When molded test specimens of a copolymer made according to the present invention are compared with similar specimens molded from a standard commercial copolymer of the same analysis made in aqueous emulsion, the product of this invention is at least as resistant to discoloration by light and heat as is the emulsion polymer. When modified with the usual stabilizers, the copolymers of this process are more resistant to discoloration by light and heat than are the similarly modified copolymers made in aqueous emulsion.

I claim:

1. The method which comprises copolymerizing a non-emulsified aqueous suspension of a mixture of monomers consisting of from 50 to 95 per cent vinyl chloride and correspondingly from 50 to 5 per cent vinylidene chloride, in a closed system to prevent loss of monomer vapor, in the presence of from 0.2 to 1 per cent of their weight of 2,4-dichlorobenzoyl peroxide and from 1 to 5 per cent of their weight of the sodium salt of sulfonated polystyrene containing from 0.15 to 0.5 sulfonate radicals per aromatic nucleus, having a particle size to pass a 100 mesh screen, U. S. sieve series, the weight ratio of water to monomers being from 1:1 to 4:1, and maintaining dispersion of the polymerizing particles by agitation at a temperature from 25° to 65° C. until at least 70 per cent polymerization has occurred.

2. The method claimed in claim 1, wherein the mixture of monomers is one consisting of 75 per cent vinyl chloride and 25 per cent vinylidene chloride.

JOHN LEO SCHICK.

REFERENCES CITED

The following references are of record in the file of this patent:

UNITED STATES PATENTS

| Number | Name | Date |
| --- | --- | --- |
| 2,031,929 | Brevers et al. | Feb. 25, 1936 |
| 2,485,270 | Folt | Oct. 18, 1949 |

OTHER REFERENCES

Fichter et al., Helv. Chim. Acte, vol. 9, pp. 279–287, (1927).